United States Patent
Xiang et al.

(10) Patent No.: US 11,165,786 B2
(45) Date of Patent: Nov. 2, 2021

(54) REMOTE ASSISTANCE CONTROLLER THAT PROVIDES CONTROL OVER WHAT A REMOTE ASSISTOR CAN ACCESS

(71) Applicant: International Business Machines Corporation, Armonk, NY (US)

(72) Inventors: Yun Xiang, Beijing (CN); Gan Zhang, Beijing (CN); Yong Qing Lu, Beijing (CN); Zhuo Hua Li, Beijing (CN); Ying Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 16/224,511

(22) Filed: Dec. 18, 2018

(65) Prior Publication Data

US 2020/0195654 A1    Jun. 18, 2020

(51) Int. Cl.
*H04L 29/06*    (2006.01)
*G06F 9/451*    (2018.01)
*H04L 29/08*    (2006.01)

(52) U.S. Cl.
CPC .......... *H04L 63/105* (2013.01); *G06F 9/453* (2018.02); *H04L 63/101* (2013.01); *H04L 67/025* (2013.01)

(58) Field of Classification Search
CPC ... H04L 63/105; H04L 67/025; H04L 63/101; H04L 67/2823; G06F 9/453;

(Continued)

(56) References Cited

U.S. PATENT DOCUMENTS 5,960,085 A * 9/1999 de la Huerga .......... G16H 10/60
340/5.61
6,717,589 B1 * 4/2004 Grillo ..................... G06F 9/453
715/715

(Continued)

FOREIGN PATENT DOCUMENTS

| CN | 201203871 Y | 3/2009 |
| CN | 107070980 A | 8/2017 |
| CN | 107135069 A | 9/2017 |

OTHER PUBLICATIONS

English Abstract for China patent application publication CN-107135069-A, filed Apr. 24, 2017.

(Continued)

*Primary Examiner* — Aravind K Moorthy
(74) *Attorney, Agent, or Firm* — Teddi E. Maranzano

(57) ABSTRACT

A remote assistance controller serves as an intermediary between a user requesting remote assistance and a remote assistor. A remote assistance policy determines what the remote assistor can see or not see on the requestor's computer system, and may additionally determine allowed or disallowed actions by the remote assistor. The remote assistance policy may be defined by the requesting user, or can be a default policy for the remote assistance controller. The remote assistance controller generates views for the requestor and for the remote assistor. When the remote assistor requests an operation on the requestor's computer system, the remote assistance controller checks the remote assistance policy to determine whether the remote assistor is allowed to perform the requested operation. When the requested operation is allowed according to the remote assistance policy, the remote assistance controller allows the requested operation, and refreshes the views for the requestor and the remote assistor.

18 Claims, 10 Drawing Sheets

(58) Field of Classification Search
CPC ... G06F 21/305; H04W 12/37; H04M 3/5125; H04M 2203/257; H04M 3/00
See application file for complete search history.

(56) References Cited

U.S. PATENT DOCUMENTS

| | | | | |
|---|---|---|---|---|
| 7,714,852 | B1* | 5/2010 | Jarman | G09G 5/00 345/204 |
| 8,655,340 | B2 | 2/2014 | Sherman | |
| 8,918,838 | B1* | 12/2014 | Baldonado | H04L 63/1466 726/1 |
| 9,069,973 | B2 | 6/2015 | Palanichamy | |
| 9,361,469 | B2* | 6/2016 | Thiyagarajan | G06F 3/1454 |
| 9,535,567 | B1* | 1/2017 | Bagrinovskiy | G06F 3/033 |
| 9,563,445 | B2 | 2/2017 | Desai et al. | |
| 9,603,018 | B2 | 3/2017 | Gonsalves | |
| 9,635,091 | B1* | 4/2017 | Laukkanen | G06F 3/04845 |
| 9,769,434 | B1* | 9/2017 | Smallwood | H04N 5/2252 |
| 10,181,056 | B2* | 1/2019 | Gao | G06F 21/84 |
| 10,311,122 | B1* | 6/2019 | Banga | G06F 16/9577 |
| 10,554,669 | B2* | 2/2020 | Calcaterra | G06F 3/0484 |
| 10,771,393 | B1* | 9/2020 | Korobov | H04L 67/34 |
| 2004/0123153 | A1* | 6/2004 | Wright | G06F 21/32 726/1 |
| 2005/0055578 | A1* | 3/2005 | Wright | H04L 63/0492 726/4 |
| 2005/0268234 | A1* | 12/2005 | Rossi, Jr. | G06F 9/453 715/705 |
| 2006/0094400 | A1* | 5/2006 | Beachem | H04M 7/121 455/410 |
| 2006/0120526 | A1* | 6/2006 | Boucher | H04L 63/12 380/247 |
| 2006/0208871 | A1* | 9/2006 | Hansen | G06F 3/1454 340/506 |
| 2007/0256019 | A1* | 11/2007 | Hirsave | G06F 3/1423 715/741 |
| 2009/0113520 | A1* | 4/2009 | Karstens | G06F 21/305 726/3 |
| 2009/0150968 | A1* | 6/2009 | Ozzie | H04L 63/08 726/1 |
| 2010/0090816 | A1* | 4/2010 | Hirsch | G06F 3/147 340/438 |
| 2010/0238194 | A1* | 9/2010 | Roach, Jr. | H04M 3/493 345/629 |
| 2010/0299759 | A1* | 11/2010 | Kim | G06F 21/52 726/28 |
| 2011/0131279 | A1* | 6/2011 | Karnik | G06Q 10/107 709/206 |
| 2011/0320940 | A1* | 12/2011 | Tsai | G06F 9/451 715/702 |
| 2012/0005390 | A1* | 1/2012 | Hoang | H04L 67/025 710/311 |
| 2012/0089683 | A1* | 4/2012 | Griesmer | H04L 51/02 709/206 |
| 2012/0144305 | A1* | 6/2012 | Bekiares | H04N 21/4316 715/733 |
| 2012/0173974 | A1* | 7/2012 | Taylor | G06F 3/04817 715/705 |
| 2012/0260307 | A1* | 10/2012 | Sambamurthy | G06F 21/60 726/1 |
| 2013/0007245 | A1* | 1/2013 | Malik | H04W 12/37 709/223 |
| 2013/0007643 | A1* | 1/2013 | Edwards | G06F 3/04895 715/763 |
| 2013/0167025 | A1* | 6/2013 | Patri | G06F 3/0481 715/706 |
| 2014/0006347 | A1* | 1/2014 | Qureshi | H04W 4/029 707/621 |
| 2014/0096204 | A1* | 4/2014 | Hoesl | H04L 63/101 726/4 |
| 2014/0180999 | A1* | 6/2014 | Chun | G06F 9/453 706/55 |
| 2014/0181892 | A1* | 6/2014 | Bokern | H04L 63/0876 726/1 |
| 2014/0181893 | A1* | 6/2014 | Bokern | H04L 9/3234 726/1 |
| 2014/0282135 | A1* | 9/2014 | Segre | G06F 9/453 715/764 |
| 2014/0304322 | A1* | 10/2014 | Dey | H04L 67/141 709/203 |
| 2015/0044964 | A1* | 2/2015 | Khan | H04W 52/0209 455/41.1 |
| 2015/0201089 | A1* | 7/2015 | Raleigh | H04M 15/80 455/414.1 |
| 2015/0222604 | A1* | 8/2015 | Ylonen | G06F 21/575 713/171 |
| 2015/0319178 | A1* | 11/2015 | Desai | H04L 67/025 726/1 |
| 2016/0029216 | A1 | 1/2016 | Gonsalves et al. | |
| 2016/0065515 | A1* | 3/2016 | Strode | H04L 51/24 709/206 |
| 2016/0094560 | A1* | 3/2016 | Stuntebeck | H04L 67/303 726/1 |
| 2016/0315967 | A1* | 10/2016 | Trevathan | H04L 63/20 |
| 2016/0350136 | A1* | 12/2016 | Karlo | G06F 9/453 |
| 2016/0366183 | A1* | 12/2016 | Smith | H04L 63/101 |
| 2016/0379010 | A1* | 12/2016 | Farkash | G06F 21/6245 726/1 |
| 2017/0006066 | A1* | 1/2017 | Eckel | H04L 63/20 |
| 2017/0078321 | A1* | 3/2017 | Maylor | H04L 51/12 |
| 2017/0142124 | A1* | 5/2017 | Mukhin | H04L 63/08 |
| 2017/0160876 | A1* | 6/2017 | Brew | G06F 9/453 |
| 2017/0163806 | A1* | 6/2017 | Shanmugam | H04W 12/068 |
| 2017/0164198 | A1* | 6/2017 | Furuichi | H04W 4/70 |
| 2017/0206096 | A1* | 7/2017 | Lubow | G06F 40/174 |
| 2017/0257393 | A1* | 9/2017 | De Barros | H04L 63/1416 |
| 2017/0277885 | A1* | 9/2017 | Olivera | G06F 21/46 |
| 2017/0286132 | A1* | 10/2017 | Fulton | G06F 9/453 |
| 2017/0289181 | A1* | 10/2017 | Wang | G06Q 20/356 |
| 2018/0039502 | A1* | 2/2018 | Singh | G06F 40/263 |
| 2018/0157765 | A1* | 6/2018 | Zhong | G06F 40/103 |
| 2018/0198683 | A1* | 7/2018 | Erb | H04L 63/205 |
| 2018/0292881 | A1* | 10/2018 | Duale | G06F 11/3041 |
| 2018/0343251 | A1* | 11/2018 | Voth | H04L 9/3228 |
| 2019/0026132 | A1* | 1/2019 | King | G06Q 30/016 |
| 2019/0044949 | A1* | 2/2019 | Bartfai-Walcott | H04L 67/10 |
| 2019/0073593 | A1* | 3/2019 | Luo | G06Q 10/10 |
| 2019/0332694 | A1* | 10/2019 | Tcherechansky | G06F 16/2365 |
| 2020/0037140 | A1* | 1/2020 | Hassan | H04W 88/10 |
| 2020/0073553 | A1* | 3/2020 | Klein | G06F 3/0653 |
| 2020/0127953 | A1* | 4/2020 | Maddipati | H04L 51/12 |
| 2020/0151345 | A1* | 5/2020 | Chauhan | G06F 21/604 |
| 2020/0159948 | A1* | 5/2020 | Sun | G06F 3/1454 |
| 2020/0329081 | A1* | 10/2020 | Allen | H04N 21/431 |

OTHER PUBLICATIONS

English Abstract for China patent application publication CN-107070980-A, filed Jan. 22, 2017.
Disclosed Anonymously, "Security and Privacy for Remote Control in Configuration Manager," Security and Privacy for Remote Control in Configuration Manager [online], May 14, 2015 [accessed on May 9, 2018], 4 pages, Retrieved from the Internet: <URL: https://technet.microsoft.com/en-US/library/gg699395.aspx>.
Khandelwal, "Windows Remote Assistance Exploit Lets Hackers Steal Sensitive Files," The Hacker News [online], Mar. 20, 2018 [May 9, 2018], 10 pages, Retrieved from the Internet: <URL: https://thehackernews.com/2018/03/window-remote-assistance.html>.

* cited by examiner

REMOTE ASSISTANCE CONTROLLER THAT PROVIDES CONTROL OVER WHAT A REMOTE ASSISTOR CAN ACCESS

BACKGROUND

1. Technical Field

This disclosure generally relates to computer systems, and more specifically relates to a remote assistance system that allows a remote assistor to assist a user.

2. Background Art

Many computer users have issues with their computers that require an expert to address. Remote assistance systems have been developed that allow an expert, such a technical support agent, to remotely take control of a user's computer so they can diagnose and fix the problem the user may be having. A simple example will illustrate. A user has problems with the user's computer, and calls the computer manufacturer's technical support telephone number to get help. During the telephone conversation with the technical support agent, the agent requests to gain control of the user's computer system so the agent can diagnose and fix the problem. When the user consents, the agent sends the user a link or piece of code, typically via e-mail or on a web page. The user must click on the link or install the piece of code. Clicking on the link or running the code gives control to the agent, who then has a view on their computer screen of the user's computer screen, and can then perform diagnostic functions to determine the cause of the user's problems.

A problem with known remote assistance systems is they give full access and control over a user's computer system to the agent, referred to herein as a remote assistor. This gives the remote assistor full access to the files and private information of the user. For obvious reasons, many users would prefer not to have all their files and private information available to a remote assistor.

BRIEF SUMMARY

A remote assistance controller serves as an intermediary between a user requesting remote assistance and a remote assistor. A remote assistance policy determines what the remote assistor can see or not see on the requestor's computer system, and may additionally determine allowed or disallowed actions by the remote assistor. The remote assistance policy may be defined by the requesting user, or can be a default policy for the remote assistance controller. The remote assistance controller generates views for the requestor and for the remote assistor. When the remote assistor requests an operation on the requestor's computer system, the remote assistance controller checks the remote assistance policy to determine whether the remote assistor is allowed to perform the requested operation. When the requested operation is allowed according to the remote assistance policy, the remote assistance controller allows the requested operation, and refreshes the views for the requestor and the remote assistor.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

A remote assistance controller serves as an intermediary between a user requesting remote assistance and a remote assistor. A remote assistance policy determines what the remote assistor can see or not see on the requestor's computer system, and may additionally determine allowed or disallowed actions by the remote assistor. The remote assistance policy may be defined by the requesting user, or can be a default policy for the remote assistance controller. The remote assistance controller generates views for the requestor and for the remote assistor. When the remote assistor requests an operation on the requestor's computer system, the remote assistance controller checks the remote assistance policy to determine whether the remote assistor is allowed to perform the requested operation. When the requested operation is allowed according to the remote assistance policy, the remote assistance controller allows the requested operation, and refreshes the views for the requestor and the remote assistor.

Figure 1:
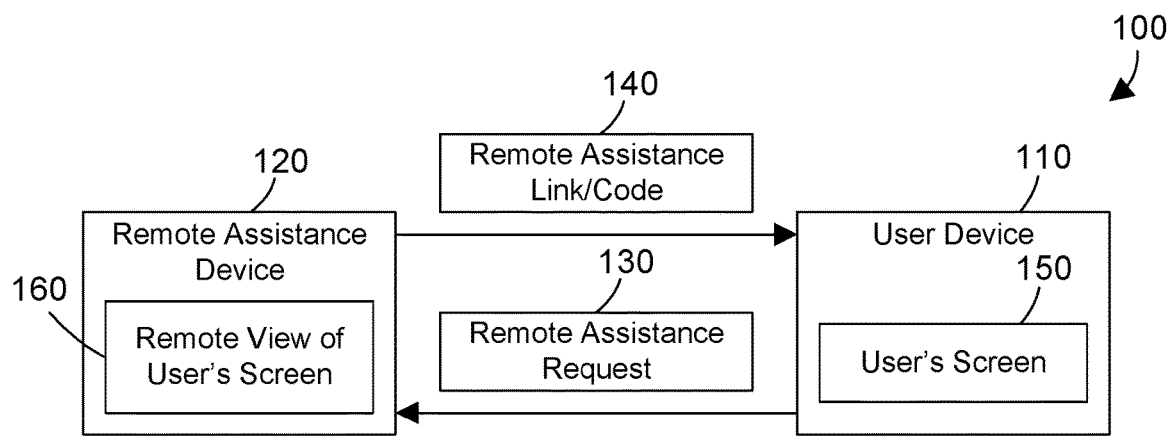
FIG. 1 is a block diagram of a prior art system for providing remote assistance.

Referring to FIG. 1, a prior art system 100 is shown that includes a user device 110 and a remote assistance device 120. We assume the user of the user device 110 needs remote assistance, and sends a remote assistance request 130 to the remote assistance device 120. In response, a remote assistor using the remote assistance device 120 sends a remote assistance link or code 140 to the user device 110. Once the user of the user device 110 clicks on the remote assistance link or runs the remote assistance code, a remote assistance session is started, and the remote assistor receives a remote view of the user's screen 160, which is a full view of the user's screen 150 on the user device 110. Because the remote view of the user's screen 160 on the remote assistance device is a full view of the user's screen 150, the remote assistor has access to all of the user's files and information, including personal information. If the remote assistor decides to access the user's files and information, the only remedy the user has is to notice the access, and terminate the remote assistance session. Many users are not very sophisticated, and a sophisticated remote assistor could potentially dupe a user into thinking the remote assistor is doing something harmless when the remote assistor is actually accessing the user's files and personal information.

Figure 2:
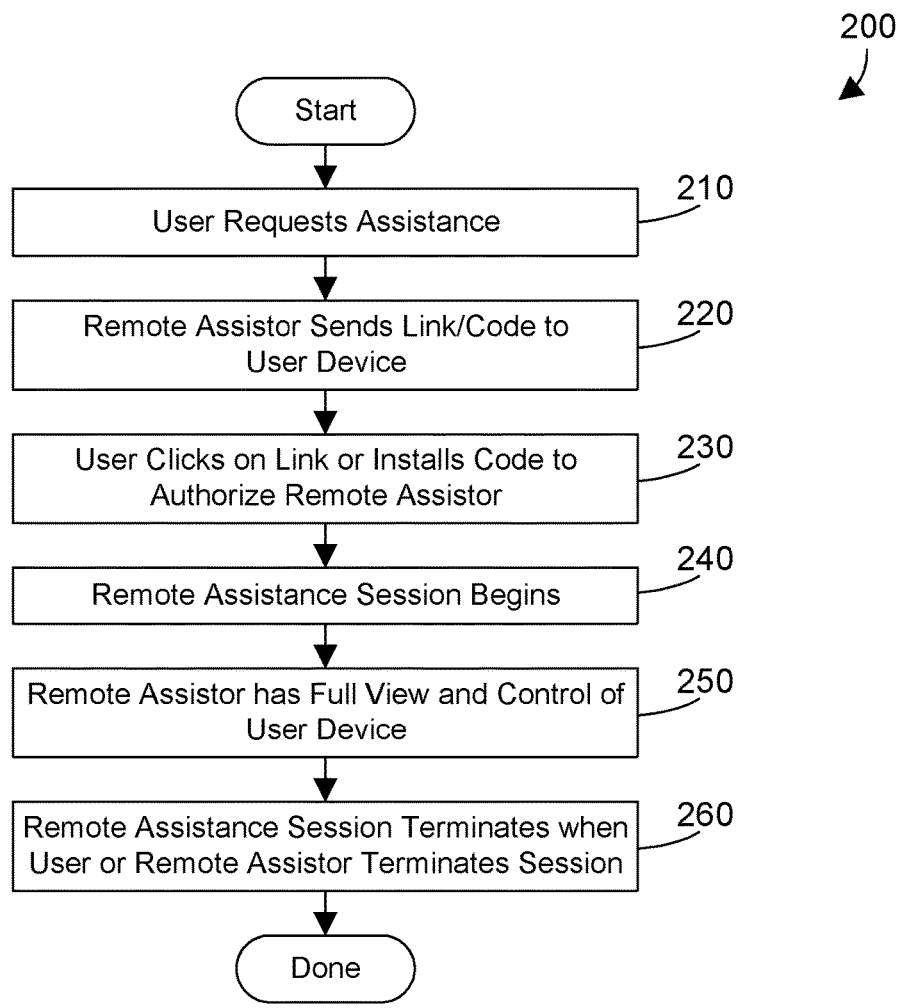
FIG. 2 is a flow diagram of a prior art method that corresponds to the system in FIG. 1.

The flow diagram 200 in FIG. 2 shows steps performed in the prior art system 100 in FIG. 1. The user requests assistance (step 210), by sending the remote assistance request 130 shown in FIG. 1. The remote assistor causes the remote assistance device 120 to send a link or code to the user device (step 220), by sending the remote assistance link/code 140 in FIG. 1. The user clicks on the link or installs the code to authorize the remote assistor (step 230). The remote assistance session begins (step 240). During the remote assistance session, the remote assistor has full view and control of the user device (step 250). The remote assistance session terminates when the user or the remote assistor terminates the session (step 260). Method 200 is then done.

Other systems have been developed that limits access to a user device by a remote assistor based on specified remote assistance policies. However, these systems still have a direction connection between the user device and the remote assistance device.

Figure 3:
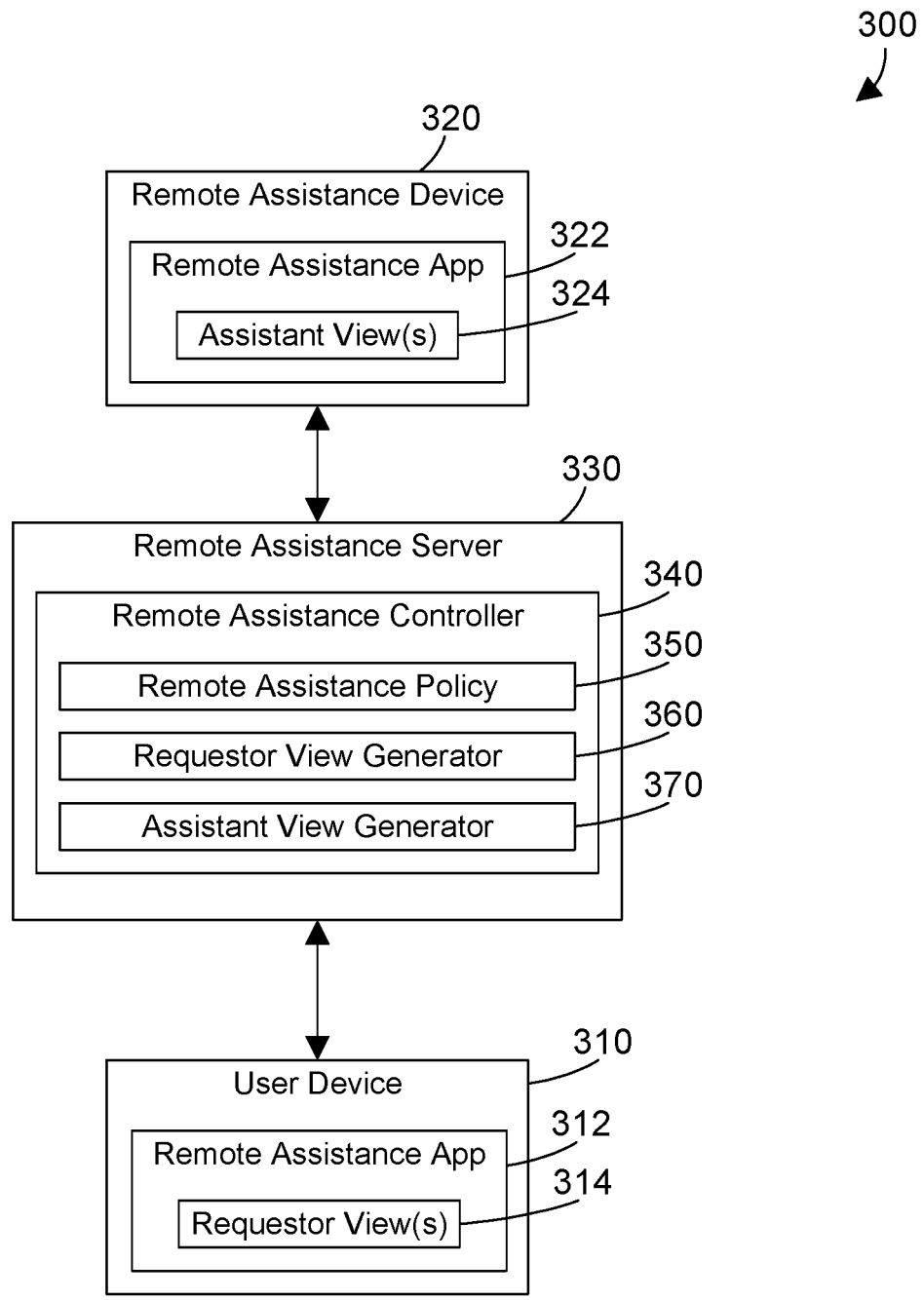
FIG. 3 is a block diagram of a system for providing remote assistance in accordance with the disclosure and claims herein.

FIG. 3 shows a system 300 for providing remote assistance within the scope of the disclosure and claims herein. A remote assistance server 330 serves as an intermediary between a user device 310 and a remote assistance device 320. The user device 310 includes a remote assistance application 312 that provides one or more requestor views 314. The remote assistance device 320 includes a remote assistance application 322 that provides one or more assistant views 324. The remote assistance server 330 includes a remote assistance controller 340. The remote assistance controller 340 preferably includes a remote assistance policy 350, a requestor view generator 360, and an assistant view generator 370. The remote assistance policy 350 is preferably defined by a user of the user device 310, and specifies at least one criterion for displaying information on the user device 310 on the assistant view 324 on the remote assistance device 320, and/or specifies at least one criterion for blanking information on the user device 310 on the assistant view 324. The remote assistance policy 350 may additionally specify operations that are allowed by the remote assistance device and/or operations that are not allowed by the remote assistance device. In the most preferred implementation, the remote assistance policy 350 may include any suitable criteria or information that restricts visibility or access to the user device 310 by the remote assistance device 320. In an alternative implementation, the remote assistance policy 350 is not defined by the requesting user, but is instead a default policy defined on a remote assistance server that governs the function of the remote assistance controller 340. In yet another alternative implementation, there could be a remote assistance policy that is defined by the requesting user, and a separate remote assistance policy defined on the remote assistance server, and the remote assistance controller could use both of these policies to assure the most restrictive criteria in both are applied during the remote assistance session. Thus, if a remote assistance policy defined on the remote assistance server is more restrictive than a remote assistance policy defined by a requesting user, the remote assistance controller would assure the criteria in both remote assistance policies are applied.

The requestor view generator 360 generates the requestor view(s) 314, which give the user a view of what the remote assistor is doing on the user device 310 during a remote assistance session. The assistant view generator 370 generates the assistant view(s) 324 on the remote assistance device 320 according to information in the remote assistance policy 350, thereby blanking portions of the user's display or restricting allowed operations on the user device by the remote assistance device. In this manner the user, by specifying appropriate criteria in the remote assistance policy 350, can restrict the access by the remote assistance device 320 to portions of the user's screen or to allowed operations. The remote assistance policy 350 thus provides fine-grain control by the user over what the remote assistor can see and do during a remote assistance session. By specifying desired criteria in the remote assistance policy 350, the user can make sure a remote assistor does not have access to certain portions of the screen or to certain operations on the user device, thus increasing the security of the user's files and personal information during a remote assistance session.

Figure 4:
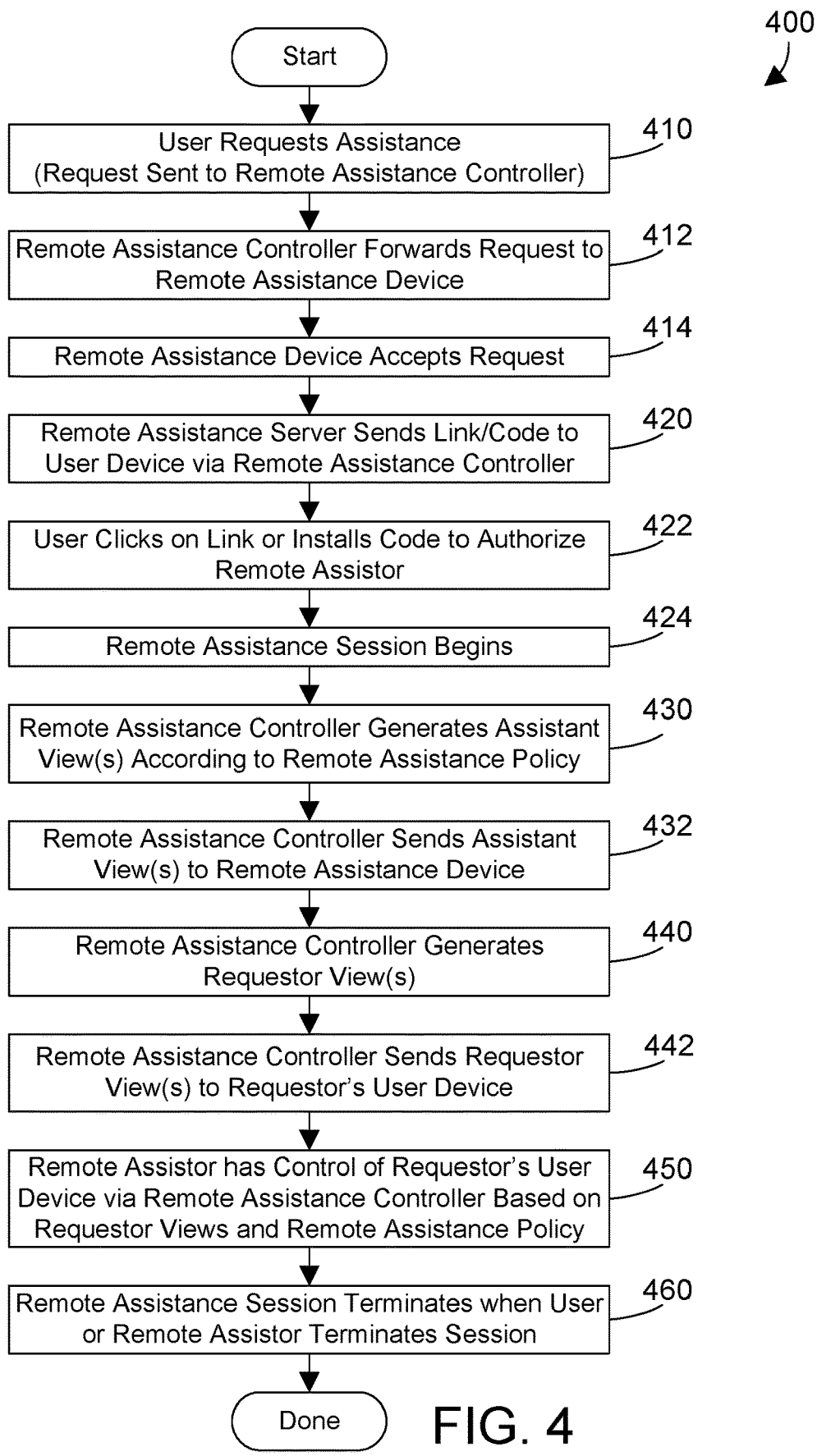
FIG. 4 is a flow diagram of a method for providing remote assistance in accordance with the disclosure and claims herein.

Referring to FIG. 4, a method 400 shows steps that are preferably performed in the remote assistance system 300 shown in FIG. 3. A user using the user device requests assistance, and this request is sent to the remote assistance controller in the remote assistance controller (step 410). The remote assistance controller forwards the request to the remote assistance device (step 412). A remote assistor using the remote assistance device accepts the request (step 414). The remote assistance device then sends a link or code to the remote assistance controller, which sends on the link or code to the user device (step 420). The user clicks on the link or installs the code to authorize the remote assistor (step 422). The remote assistance session begins (step 424). During the remote assistance session, the remote assistance controller generates assistant views according to the remote assistance policy (step 430), meaning one or more portions of the user's display are blanked on the assistant view based on the remote assistance policy, and one or more operations may be disallowed based on the remote assistance policy. The remote assistance controller sends the assistant view(s) to the remote assistant device (step 432). The remote assistance controller generates the requestor views (step 440). The remote assistance controller sends the requestor view(s) to the requestor's user device (step 442). The requestor view(s) allow the user to see what the remote assistor is doing during the remote assistance session. During the remote assistance session, the remote assistor has control of the requestor's user device via the remote assistance controller based on the requestor views and the remote assistance policy (step 450). The remote assistance session terminates when either the user or the remote assistor terminates the session (step 460). Method 400 is then done.

Figure 5:
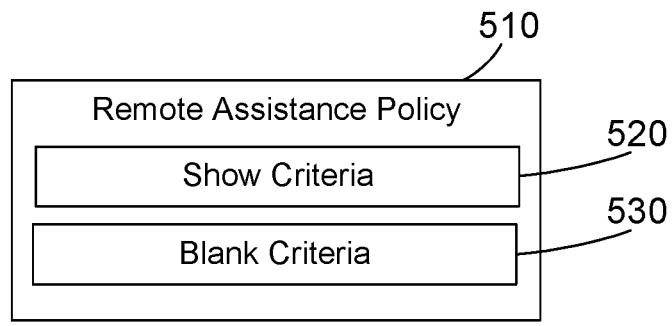
FIG. 5 is a block diagram showing suitable criteria that could be included in a remote assistance policy.

FIG. 5 shows a remote assistance policy 510, which is one suitable example of the remote assistance policy 350 shown in FIG. 3. Remote assistance policy 510 may specify "show criteria" 520 that specifies one or more portions of the user's display to show in the assistant view(s) 324, and may alternatively or additionally specify "blank criteria" 530 that specifies one or more portions of the user's display not to show in the assistant view(s) 324.

Figure 6:
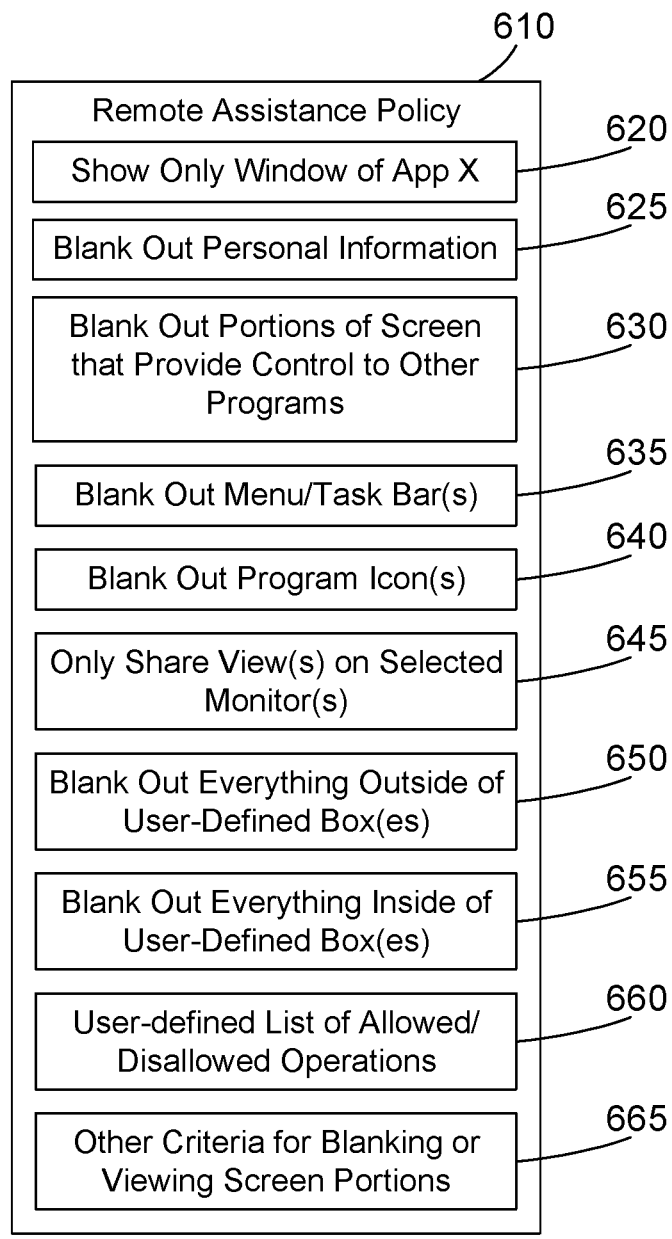
FIG. 6 is a block diagram showing detailed examples of criteria that could be included in a remote assistance policy.

A sample remote assistance policy 610 is shown in FIG. 6 as one suitable example of the remote assistance policy 350 in FIGS. 3 and 510 in FIG. 5. The remote assistance policy 610 is shown to illustrate that many different criteria could be specified in a remote assistance policy to restrict what the remote assistor can see or access on the user device during a remote assistance session. Examples of suitable criteria shown in remote assistance policy 610 in FIG. 6 include: show only the window of a specified application 620; blank out personal information 625; blank out portions of the screen that provide control to other programs 630; blank out menu and task bars 635; blank out program icons; in a system that includes multiple monitors, only sharing view(s) on one or more selected monitors 645; blank out everything outside one or more user-defined boxes 650; blank out everything inside of one or more user-defined boxes 655; a user-defined list of allowed and/or disallowed operations 660; and other criteria for blanking or viewing screen portions 665. Show only the window of a specified application 620 allows a user to specify an application for which the user wants remote assistance, which will make all other application windows and all system windows on the user device blanked out to the remote assistor. Blank out personal information 625 may be done in any suitable way, including analyzing the user's display for information that the user has flagged as personal information, such as name, address, phone, credit card info, etc., then specifying one or more portions of the display of the user device not to include in the assistant view(s). Blank out portions of the screen that provide control to other programs 630 allows blanking icons, task bars, and any other screen portions that provide control to other programs. Blank out program icons 640 allows blanking icons that a user normally selects to invoke programs on the user device. Of course, one application for which the user is requesting remote assistance may be excluded from the blanking out in 640. In a multi-monitor system, the user could specify only to share view(s) on one or more selected monitors. For example, if the user has three monitors, the user could share the view on one of the three monitors with the remote assistor, while not sharing the views on the two remaining monitors with the remote assistor. The user could thus make sure any personal information or program icons for other programs would be on other monitors before starting the remote assistance session for the one specified monitor. Blank out everything outside of user-defined boxes 650 allows the user to create any suitable number of boxes on the user's display that the user wants the remote assistor to access, while everything outside those user-defined boxes are blanked from the remote assistor's view. A user could create a user-defined box by clicking a mouse or other pointer on one corner of the box and dragging the mouse or pointer to an opposite corner of the box, as is well-known in the art of computer drafting. Blank out everything inside of the user-defined boxes 655 operates in similar manner, allowing a user to defined one or more boxes, but the difference is the user's boxes define what is to be blanked out on the screen not what is to be displayed. The user-defined list of allowed and/or disallowed operations 660 allows the user to specify what operations the remote assistor is authorized to perform. Thus, if the remote assistor is helping with the user's use of a .pdf editor, the user-defined list of allowed and/or disallowed operations 660 might specify to allow all operations for the .pdf editor, and disallow all operating system operations and disallow calling other programs. The other criteria for blanking or viewing screen portions 665 broadly includes any suitable criteria the user could specify to display or blank a portion of the display on the user device in the assistance view(s). Note that a combination of criteria could also be specified. For example, a software tool could provide a drop-down menu of all the criteria shown in FIG. 6, and allow the user to select one or more of the criteria for the remote assistance policy 610. Examples of several of these criteria in FIG. 6 are discussed below with reference to FIGS. 11-15.

Figure 7:
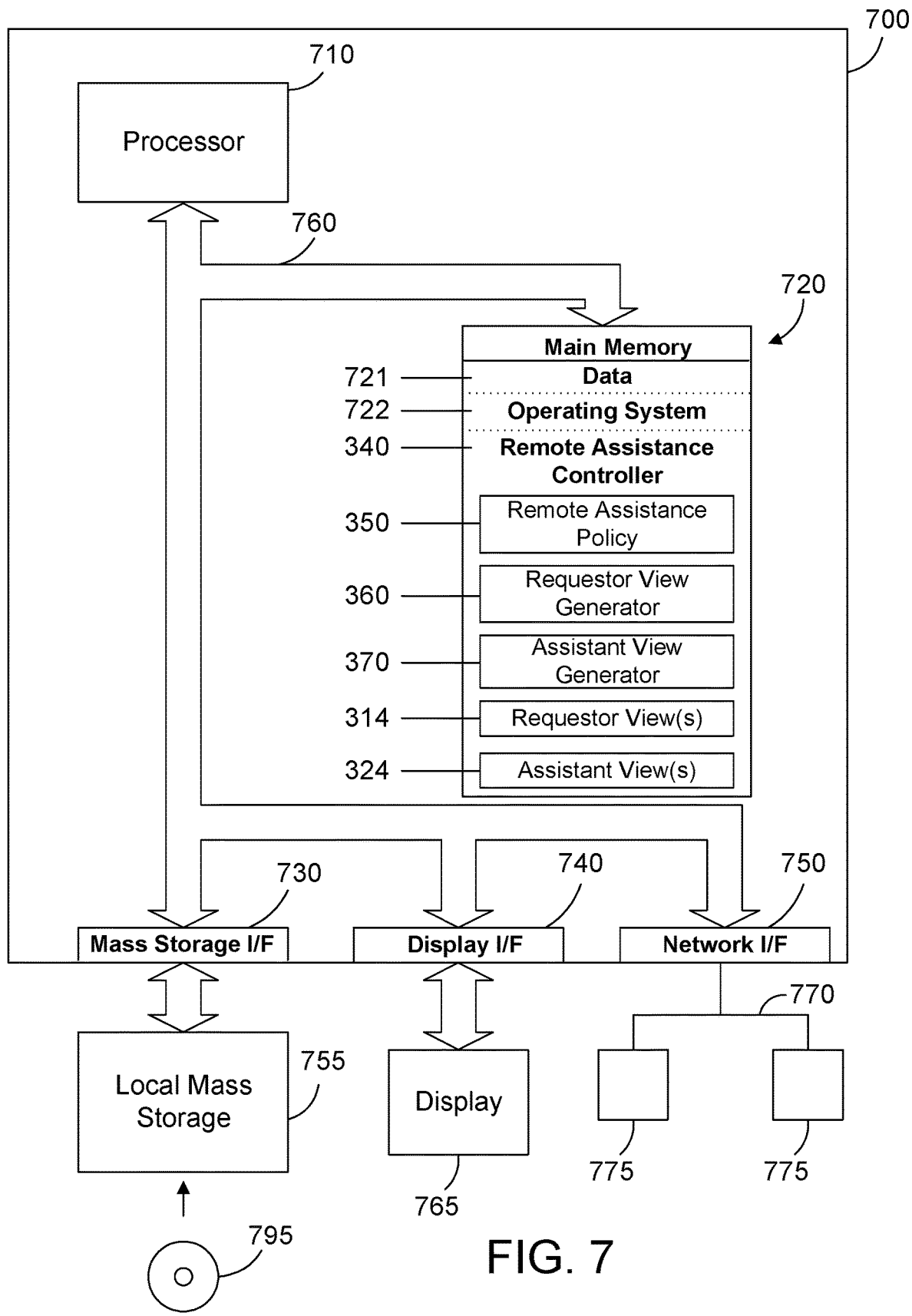
FIG. 7 is a block diagram of a computer system that includes a remote assistance controller.

Referring to FIG. 7, a computer system 700 is one suitable implementation of a computer system that includes the remote assistance controller 340 shown in FIG. 3. Computer system 700 is thus one suitable implementation for the remote assistance server 330 shown in FIG. 3. Computer system 700 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 7, computer system 700 comprises one or more processors 710, a main memory 720, a mass storage interface 730, a display interface 740, and a network interface 750. These system components are interconnected through the use of a system bus 760. Mass storage interface 730 is used to connect mass storage devices, such as local mass storage device 755, to computer system 700. One specific type of local mass storage device 755 is a readable and writable CD-RW drive, which may store data to and read data from a CD-RW 795. Another suitable type of local mass storage device 755 is a card reader that receives a removable memory card, such as an SD card, and performs reads and writes to the removable memory. Yet another suitable type of local mass storage device 755 is universal serial bus (USB) that reads a storage device such as a flash drive.

Main memory 720 preferably contains data 721, an operating system 722, and a remote assistance controller 340, as discussed above. Data 721 represents any data that serves as input to or output from any program in computer system 700. Operating system 722 is a multitasking operating system, such as AIX or LINUX. The remote assistance controller 340 includes the remote assistance policy 350, requestor view generator 360, and assistant view generator 370, as discussed above. The requestor view generator 360 generates one or more requestor views 314 that are sent to the user device, and the assistant view generator 370 generators one or more assistant views 324 that are sent to the remote assistance device.

Computer system 700 utilizes well known virtual addressing mechanisms that allow the programs of computer system 700 to behave as if they only have access to a large, contiguous address space instead of access to multiple, smaller storage entities such as main memory 720 and local mass storage device 755. Therefore, while data 721, operating system 722, and remote assistance controller 340 are shown to reside in main memory 720, those skilled in the art will recognize that these items are not necessarily all completely contained in main memory 720 at the same time. It should also be noted that the term "memory" is used herein generically to refer to the entire virtual memory of computer system 700, and may include the virtual memory of other computer systems coupled to computer system 700.

Processor 710 may be constructed from one or more microprocessors and/or integrated circuits. Processor 710 executes program instructions stored in main memory 720. Main memory 720 stores programs and data that processor 710 may access. When computer system 700 starts up, processor 710 initially executes the program instructions that make up operating system 722. Processor 710 also executes the remote assistance controller 340.

Although computer system 700 is shown to contain only a single processor and a single system bus, those skilled in the art will appreciate that a remote assistance controller as described herein may be practiced using a computer system that has multiple processors and/or multiple buses. In addition, the interfaces that are used preferably each include separate, fully programmed microprocessors that are used to off-load compute-intensive processing from processor 710. However, those skilled in the art will appreciate that these functions may be performed using I/O adapters as well.

Display interface 740 is used to directly connect one or more displays 765 to computer system 700. These displays 765, which may be non-intelligent (i.e., dumb) terminals or fully programmable workstations, are used to provide system administrators and users the ability to communicate with computer system 700. Note, however, that while display interface 740 is provided to support communication with one or more displays 765, computer system 700 does not necessarily require a display 765, because all needed interaction with users and other processes may occur via network interface 750.

Network interface 750 is used to connect computer system 700 to other computer systems or workstations 775 via network 770. Computer systems 775 represent computer systems that are connected to the computer system 700 via the network interface 750 in a computer cluster. Network interface 750 broadly represents any suitable way to interconnect electronic devices, regardless of whether the network 770 comprises present-day analog and/or digital techniques or via some networking mechanism of the future. Network interface 750 preferably includes a combination of hardware and software that allows communicating on the network 770. Software in the network interface 750 preferably includes a communication manager that manages communication with other computer systems 775 via network 770 using a suitable network protocol. The other computer systems 775 may include the user device 310 and the remote assistance device 320 shown in FIG. 3. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 750. In one suitable implementation, the network interface 750 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
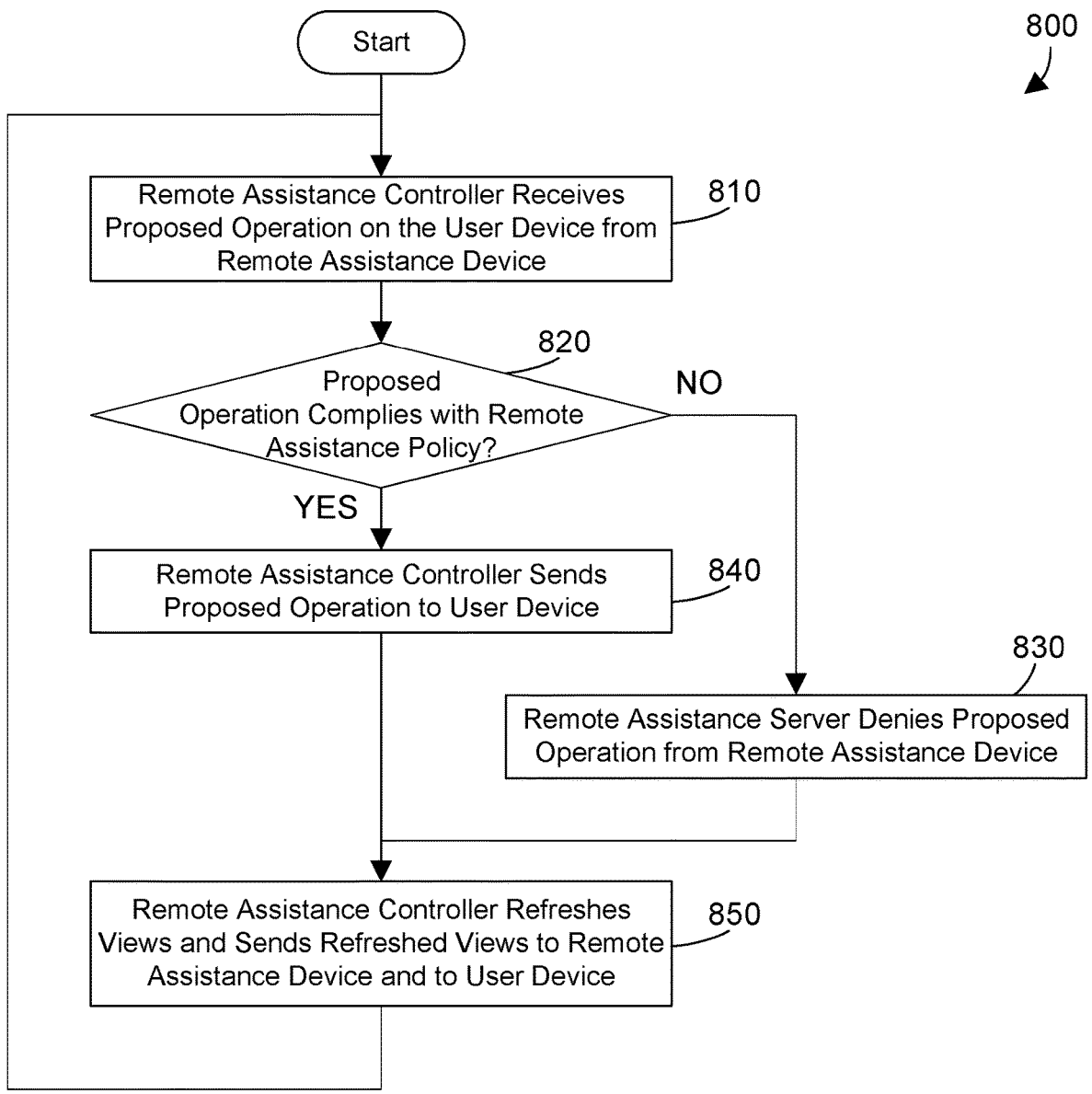
FIG. 8 is a flow diagram of a method for the remote assistance controller to handle a proposed operation received from a remote assistance device.

Referring to FIG. 8, a method 800 is preferably performed by the remote assistance controller 340 in FIGS. 3 and 7 during a remote assistance session. The remote assistance controller receives a proposed operation on the user device from the remote assistance device (step 810). When the proposed operation does not comply with the remote assistance policy (step 820=NO), the remote assistance server denies the proposed operation from the remote assistance device (step 830). The remote assistance controller refreshes the requestor view and the assistant view and sends the refreshed views to the remote assistance device and to the user device (step 850). When the proposed operation complies with the remote assistance policy (step 820=YES), the remote assistance controller sends the proposed operation to the user device (step 840). The remote assistance controller then refreshes the requestor view and the assistant view and sends the refreshed views to the remote assistance device and to the user device (step 850). Method 800 then loops back to step 810 and continues. Method 800 illustrates how the remote assistance controller, acting as an intermediary between the user device and the remote assistance device, can deny a proposed operation when the proposed operation does not comply with the remote assistance policy defined by the user of the user device.

Figure 9:
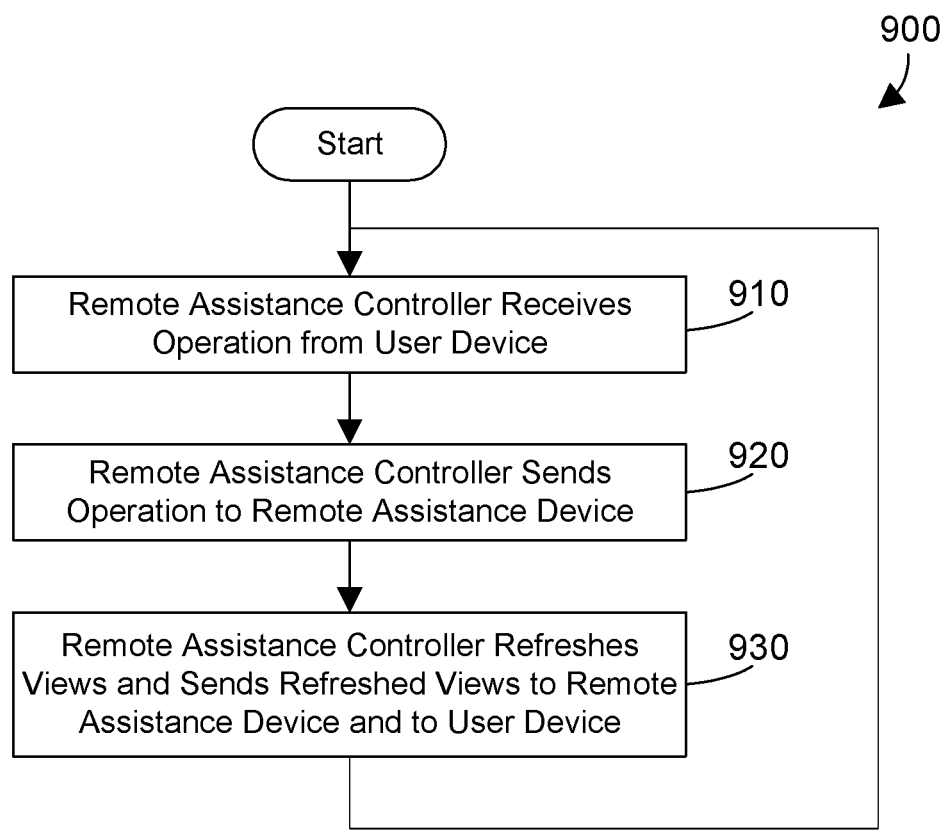
FIG. 9 is a flow diagram of a method for the remote assistance controller to handle an operation received from a user device.

FIG. 9 shows a method 900 that is preferably performed by the remote assistance controller 340 during a remote assistance session. The remote assistance controller receives an operation from the user device (step 910). The remote assistance controller sends the operation to the remote assistance device (step 920). The remote assistance controller refreshes the requestor view and assistant view and sends the refreshed views to the remote assistance device and to the user device (step 930). Method 900 loops back to step 910 and continues. One of the operations the user may send is to terminate the current remote assistance session.

Figure 10:
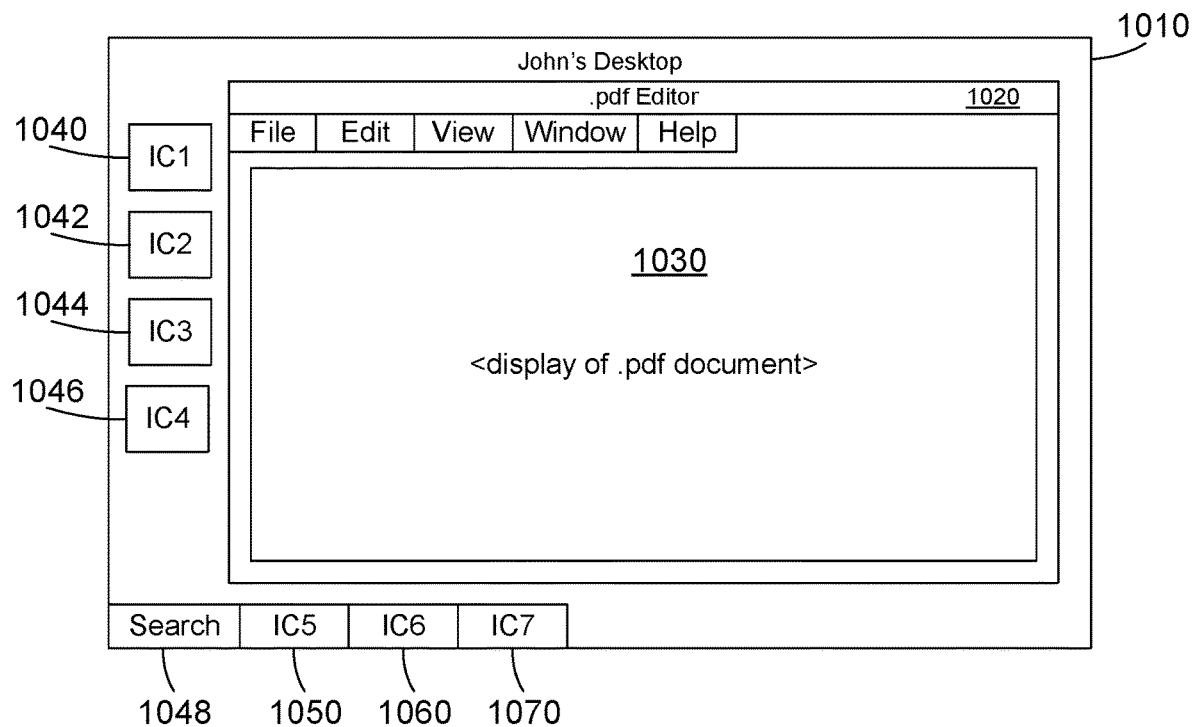
FIG. 10 is a sample user display on a user device.
Figure 11:
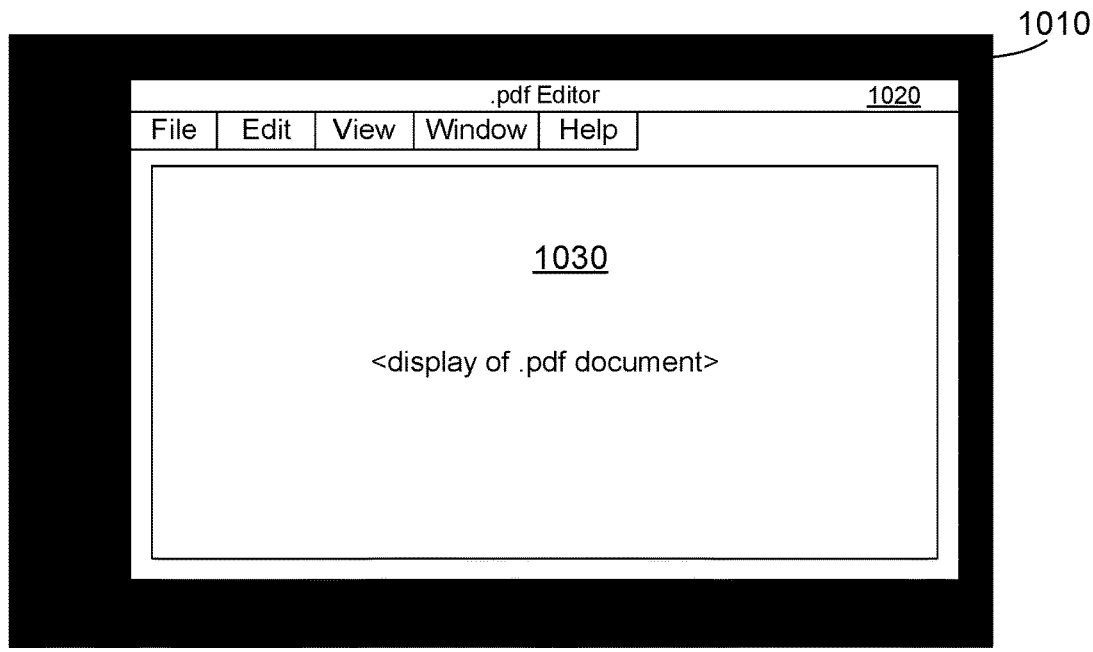
FIG. 11 is a sample assistant view of the user display in FIG. 10 when the remote assistance policy specifies to show only the window of the .pdf editor application.

Several examples are now given in FIGS. 10-15 to illustrate some of the concepts discussed above. FIG. 10 is a display of "John's Desktop" 1010, which we assume for this example is all of the user's display on the user's computer system, which for this example is the user device. John's Desktop 1010 include an open window of a .pdf editor 1020, which includes a display of a .pdf document 1030. John's desktop also include some program icons 1040, 1042, 1044 and 1046. John's Desktop 1010 additionally includes a search box 1048, as well as selectable items 1050, 1060 and 1070 on a task bar. We assume for this example the user wants remote assistance for using the .pdf editor, and sends such a request to the remote assistance controller. The remote assistance controller forwards this request to the remote assistance device, and in response, a remote assistor using the remote assistance device sends a link or code to the remote assistance controller. The user clicks the link or installs and runs the code, which causes the remote assistance server to begin the remote assistance session. We assume the user has specified in the remote assistance policy 350 to show only the window of the .pdf editor application (e.g., 620 in FIG. 6). The assistant view generator 370 then generates an assistant view 324 that blanks out everything outside of the application window 1030 for the .pdf editor, as shown in FIG. 11. Note the term "blank out" can mean not only visually obscuring a portion of the screen, but also can include deactivating any icons or other control features so they cannot be selected by the remote assistor. This assures the remote assistor cannot randomly click on blanked out portions of the screen and thereby activate an underlying icon that cannot be seen.

Figure 12:
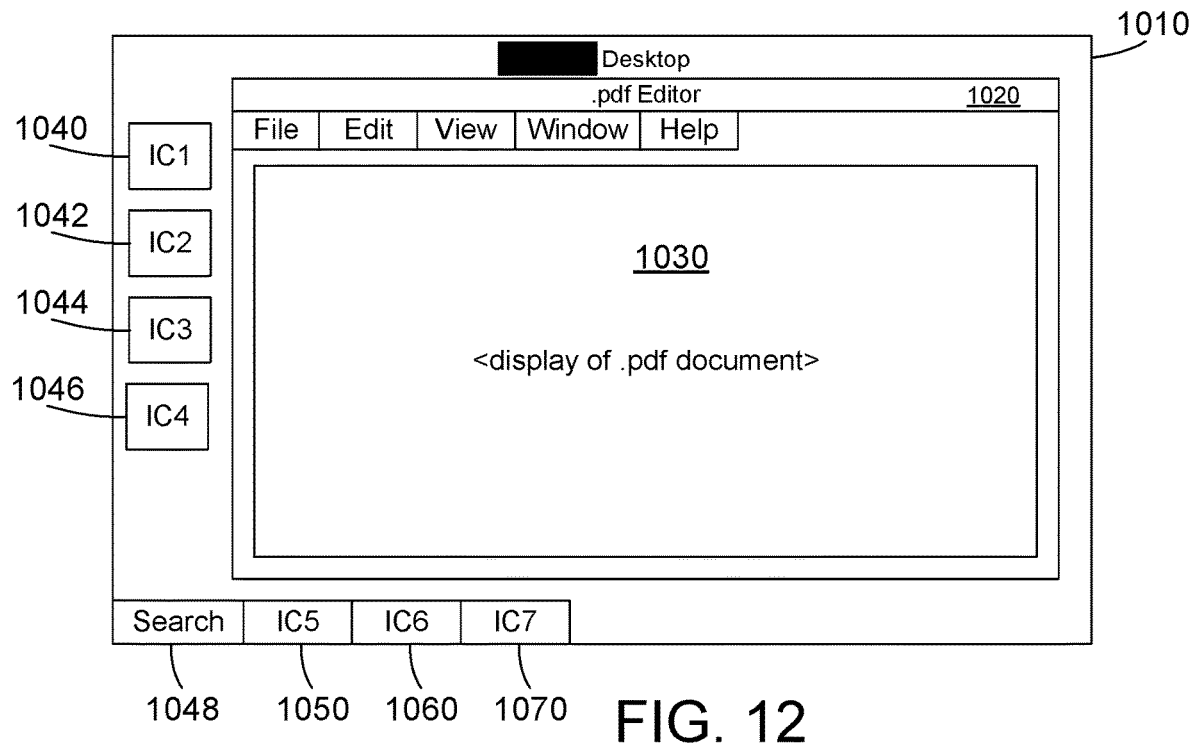
FIG. 12 is a sample assistant view of the user display in FIG. 10 when the remote assistance policy specifies to blank out personal information.
Figure 13:
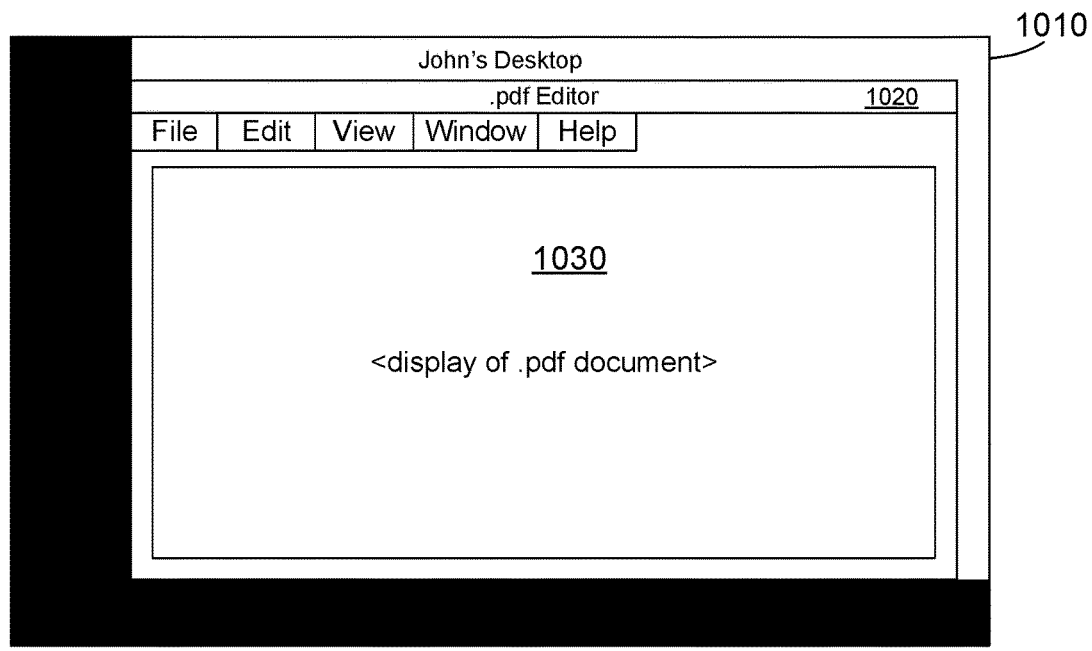
FIG. 13 is a sample assistant view of the user display in FIG. 10 when the remote assistance policy specifies to blank out portions of the screen that provide control to other programs.
Figure 14:
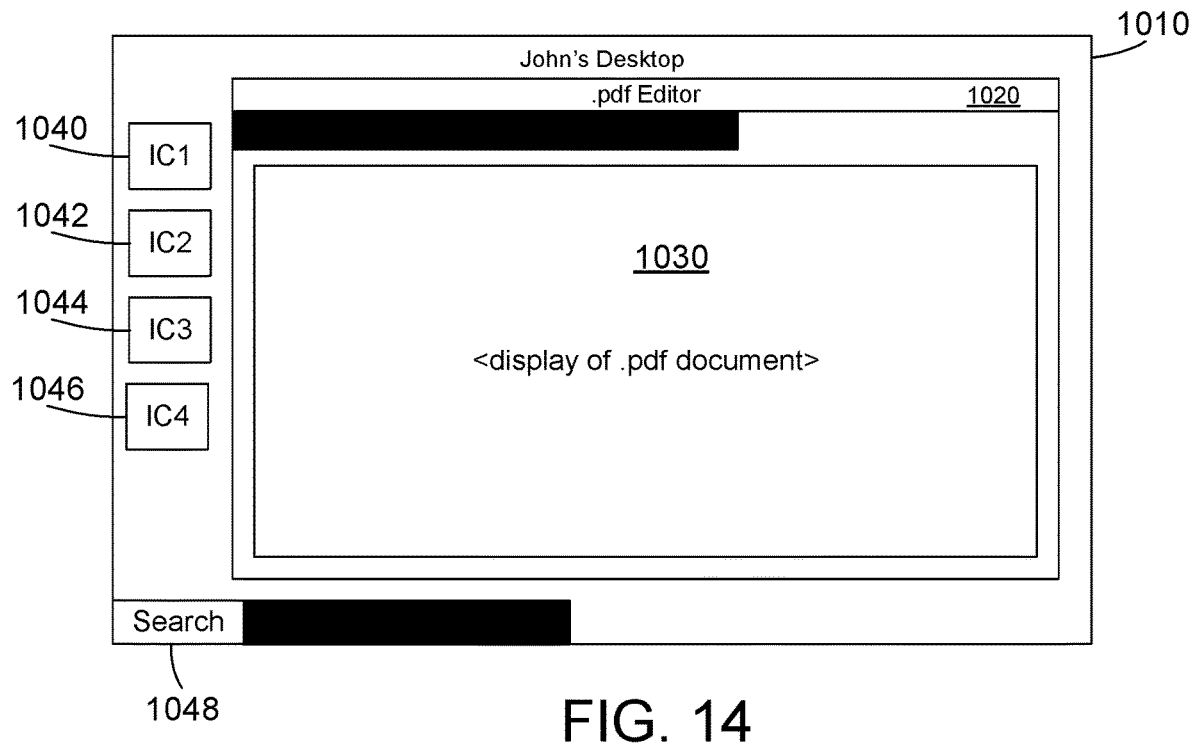
FIG. 14 is a sample assistant view of the user display in FIG. 10 when the remote assistance policy specifies to blank out menu bars.
Figure 15:
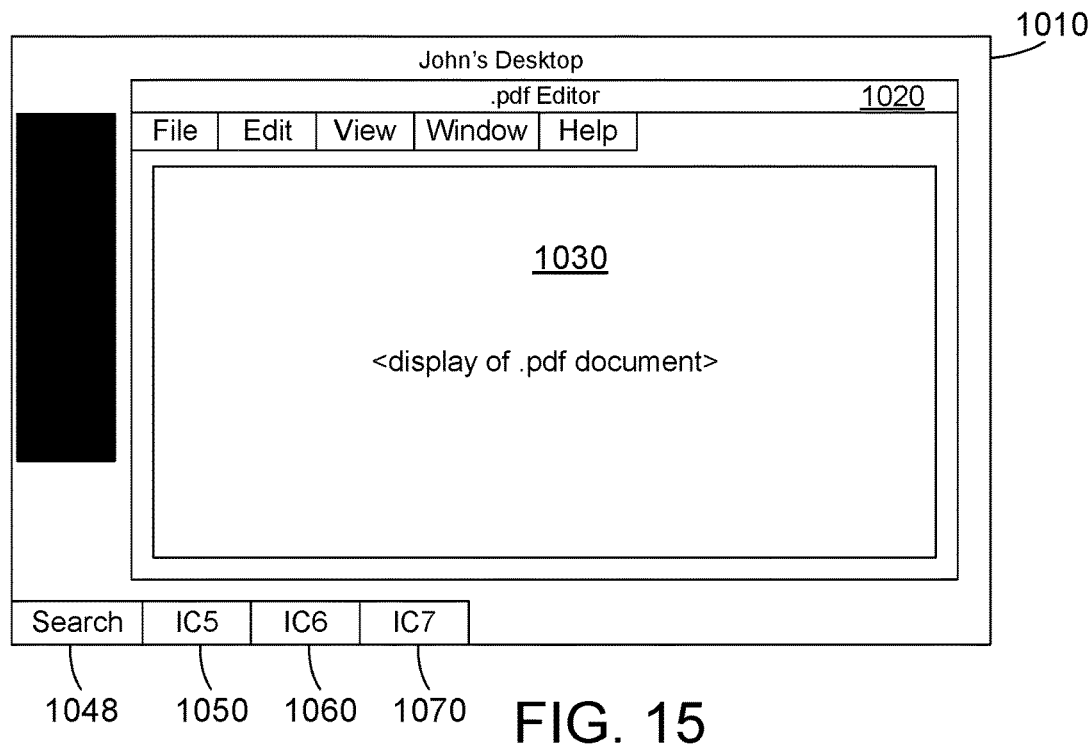
FIG. 15 is a sample assistant view of the user display in FIG. 10 when the remote assistance policy specifies to blank out program icons.

For a second example, we assume the user has specified in the remote assistance policy 350 to blank out personal information (e.g., 625 in FIG. 6). We assume the user has defined personal information to include his name. The assistant view generator 370 then generates an assistant view 324 that blanks out "John's", and sends the assistant view 324 as shown in FIG. 12 to the remote assistance device. This would allow the user to interact with the remote assistor in an anonymous manner, without the remote assistor learning the user's first name.

For a third example, we assume the user has specified in the remote assistance policy 350 to blank out all portions of the screen that provide control to other programs (e.g., 630 in FIG. 630). The assistant view generator 370 then generates an assistant view 324 that blanks out the left and bottom portions of the screen that include the program icons 1040, 1042, 1044 and 1046, the search field 1048, and the task bar buttons 1050, 1060 and 1070, and sends the assistant view 324 shown in FIG. 13 to the remote assistance device. Once again, blanking out preferably includes not only making those portions of the screen unviewable to the remote assistor, but also includes making any underlying control elements unselectable.

For a fourth example, we assume the user has specified in the remote assistance policy 350 to blank out menu bars and task bars (e.g., 635 in FIG. 6). The assistant view generator 370 then generates an assistant view 324 that blanks out the menu bar in the .pdf editor, as well as the task bar that includes items 1050, 1060 and 1070, and sends the assistant view 324 shown in FIG. 14 to the remote assistance device. Again, blanking out preferably includes not only making those portions of the screen unviewable to the remote assistor, but also includes making any underlying control elements unselectable.

For a fifth example, we assume the user has specified in the remote assistance policy 350 to blank out program icons (e.g., 640 in FIG. 6). The assistant view generator 370 then generates an assistant view 324 that blanks out the program icons 1040, 1042, 1044 and 1046, and sends the assistant view 324 shown in FIG. 15 to the remote assistance device. Blanking out preferably includes not only making those portions of the screen unviewable to the remote assistor, but also includes making any underlying control elements unselectable.

Note that portions of a display can be blanked out in other ways as well. For example, the assistant view in FIG. 11 could be generated based on a user drawing a rectangular box around the .pdf editor window 1020, then specifying to blank out everything outside the user box (e.g., 650 in FIG. 6). The same assistant view in FIG. 11 could be generated based on the user drawing four rectangular boxes that overlap, one above the .pdf editor window 1020, one below, one to the left, and one to the right, then specifying to blank out everything inside the rectangular boxes defined by the user (e.g., 655 in FIG. 6). Similarly, the assistant views in FIGS. 12-15 could each be generated based on a remote assistance policy 350 wherein the user has defined regions, then specified to blank out everything outside or inside those regions.

While the examples in FIGS. 10-15 show a desktop computer view on a user device, the disclosure and claims herein extend to any suitable electronic device, including without limitation desktop computers, laptop computers, notebook computers, tablet computers, mobile phones, gaming consoles, or any other user device for which a user might need remote assistance.

The disclosure and claims herein support an apparatus comprising: at least one processor; a memory coupled to the at least one processor; and a remote assistance controller residing in the memory and executed by the at least one processor, the remote assistance controller serving as intermediary between a user device and a remote assistance device, the remote assistance controller comprising: a remote assistance policy that defines at least one criterion for blanking information displayed on the user device in an assistant view on the remote assistance device; a requestor view generator that generates a requestor view on the user device; and an assistant view generator that generates the assistant view on the remote assistance device with at least one portion blanked according to the at least one criterion for blanking information in the remote assistance policy.

The disclosure and claims herein further support an apparatus comprising: at least one processor; a memory coupled to the at least one processor; and a remote assistance controller residing in the memory and executed by the at least one processor, the remote assistance controller serving as intermediary between a user device and a remote assistance device, the remote assistance controller comprising: a remote assistance policy that defines at least one criterion for blanking information displayed on the user device in an assistant view on the remote assistance device, the remote assistance policy comprising: criteria for blanking in the assistant view all portions of the display on the user device outside an active window of a specified software application; criteria for blanking in the assistant view all portions of the display on the user device that provide control to programs on the user device other than a selected one program; and a list of allowed and disallowed operations on the user device; a requestor view generator that generates a requestor view on the user device; and an assistant view generator that generates the assistant view on the remote assistance device with at least one portion blanked according to the at least one criterion for blanking information in the remote assistance policy; wherein the remote assistance controller receives a request from the user device for remote assistance, and in response, forwards the request to the remote assistance device, wherein a remote assistor using the remote assistance device accepts the request from the user device for remote assistance, and in response, the remote assistance device sends a link or code to the remote assistance controller, which forwards the link or code to the user device, wherein, when a user of the user device clicks on the link or executes the code received from the remote assistance controller, the remote assistance controller begins a remote assistance session, and during the remote assistance session, the requestor view generator generates and sends the requestor view to the user device and the assistant view generator generates and sends the assistant view to the remote assistance device, wherein the assistant view sent to the remote assistance device includes the at least one portion blanked according to the at least one criterion for blanking information in the remote assistance policy, wherein the remote assistance controller receives a proposed operation from the remote assistance device, determines whether the proposed operation complies with the remote assistance policy, and when the proposed operation complies with the remote assistance policy, the remote assistance controller sends the proposed operation to the user device, refreshes the requestor view and the assistant view, sends the refreshed requestor view to the user device, and sends the refreshed assistant view to the remote assistance device.

The disclosure and claims herein additionally support a computer-implemented method executed by at least one processor for a remote assistance controller to act as intermediary between a remote assistor using a remote assistance device and a user using a user device to provide remote assistance to the user, the method comprising: the remote assistance controller receiving a request from the user device for remote assistance, and in response, forwarding the request to the remote assistance device; the remote assistor using the remote assistance device accepting the request from the user device for remote assistance, and in response, the remote assistance device sends a link or code to the remote assistance controller; the remote assistance controller forwarding the link or code to the user device; when a user of the user device clicks on the link or executes the code received from the remote assistance controller, the remote assistance controller begins a remote assistance session; and during the remote assistance session, generating and sending the requestor view to the user device and generating and sending the assistant view to the remote assistance device, wherein the assistant view sent to the remote assistance device includes at least one portion blanked according to the at least one criterion for blanking information in a remote assistance policy specified by the user.

A remote assistance controller serves as an intermediary between a user requesting remote assistance and a remote assistor. A remote assistance policy determines what the remote assistor can see or not see on the requestor's computer system, and may additionally determine allowed or disallowed actions by the remote assistor. The remote assistance policy may be defined by the requesting user, or can be a default policy for the remote assistance controller. The remote assistance controller generates views for the requestor and for the remote assistor. When the remote assistor requests an operation on the requestor's computer system, the remote assistance controller checks the remote assistance policy to determine whether the remote assistor is allowed to perform the requested operation. When the requested operation is allowed according to the remote assistance policy, the remote assistance controller allows the requested operation, and refreshes the views for the requestor and the remote assistor.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor; and
   a remote assistance controller residing in the memory and executed by the at least one processor, the remote assistance controller serving as intermediary between a user device and a remote assistance device, the remote assistance controller comprising:
      a remote assistance policy that defines at least one criterion for blanking information displayed on the user device in an assistant view on the remote assistance device;
      a requestor view generator that generates a requestor view on the user device; and
      an assistant view generator that generates the assistant view on the remote assistance device with at least one portion blanked according to the at least one criterion for blanking information in the remote assistance policy,
   wherein the remote assistance controller receives a proposed operation from the remote assistance device, determines whether the proposed operation complies with the remote assistance policy, and when the proposed operation complies with the remote assistance policy, the remote assistance controller sends the proposed operation to the user device, refreshes the requestor view and the assistant view, sends the refreshed requestor view to the user device, and sends the refreshed assistant view to the remote assistance device.

2. The apparatus of claim 1 wherein the remote assistance controller receives a request from the user device for remote assistance, and in response, forwards the request to the remote assistance device.

3. The apparatus of claim 2 wherein a remote assistor using the remote assistance device accepts the request from the user device for remote assistance, and in response, the remote assistance device sends a link or code to the remote assistance controller, which forwards the link or code to the user device.

4. The apparatus of claim 3 wherein, when a user of the user device clicks on the link or executes the code received from the remote assistance controller, the remote assistance controller begins a remote assistance session, and during the remote assistance session, the requestor view generator generates and sends the requestor view to the user device and the assistant view generator generates and sends the assistant view to the remote assistance device, wherein the assistant view sent to the remote assistance device includes the at least one portion blanked according to the at least one criterion for blanking information in the remote assistance policy.

5. The apparatus of claim 4 wherein the remote assistance session is terminated by one of the user and the remote assistor selecting to terminate the remote assistance session.

6. The apparatus of claim 1 wherein the remote assistance policy specifies to blank in the assistant view all portions of the display on the user device outside an active window of a specified software application.

7. The apparatus of claim 1 wherein the remote assistance policy specifies to blank in the assistant view all portions of the display on the user device that provide control to programs on the user device other than a selected one program.

8. The apparatus of claim 1 wherein the remote assistance policy comprises a list of allowed and disallowed operations on the user device.

9. The apparatus of claim 1 wherein the remote assistance policy specifies to blank in the assistant view all portions of the display on the user device outside a box defined by the user.

10. The apparatus of claim 1 wherein the remote assistance policy specifies to blank in the assistant view any personal information on the display on the user device.

11. An apparatus comprising:
    at least one processor;
    a memory coupled to the at least one processor; and
    a remote assistance controller residing in the memory and executed by the at least one processor, the remote assistance controller serving as intermediary between a user device and a remote assistance device, the remote assistance controller comprising:
       a remote assistance policy that defines at least one criterion for blanking information displayed on the user device in an assistant view on the remote assistance device, the remote assistance policy comprising:
          criteria for blanking in the assistant view all portions of the display on the user device outside an active window of a specified software application;
          criteria for blanking in the assistant view all portions of the display on the user device that provide control to programs on the user device other than a selected one program; and
          a list of allowed and disallowed operations on the user device;
       a requestor view generator that generates a requestor view on the user device; and
       an assistant view generator that generates the assistant view on the remote assistance device with at least one portion blanked according to the at least one criterion for blanking information in the remote assistance policy;
    wherein the remote assistance controller receives a request from the user device for remote assistance, and in response, forwards the request to the remote assistance device, wherein a remote assistor using the remote assistance device accepts the request from the user device for remote assistance, and in response, the remote assistance device sends a link or code to the remote assistance controller, which forwards the link or code to the user device, wherein, when a user of the user device clicks on the link or executes the code received from the remote assistance controller, the remote assistance controller begins a remote assistance session, and during the remote assistance session, the requestor view generator generates and sends the requestor view to the user device and the assistant view generator generates and sends the assistant view to the remote assistance device, wherein the assistant view sent to the remote assistance device includes the at least one portion blanked according to the at least one criterion for blanking information in the remote assistance policy, wherein the remote assistance controller receives a proposed operation from the remote assistance device, determines whether the proposed operation complies with the remote assistance policy, and when the proposed operation complies with the remote assistance policy, the remote assistance controller sends the proposed operation to the user device, refreshes the requestor view and the assistant view, sends the refreshed requestor view to the user device, and sends the refreshed assistant view to the remote assistance device.

12. A computer-implemented method executed by at least one processor for a remote assistance controller to act as intermediary between a remote assistor using a remote assistance device and a user using a user device to provide remote assistance to the user, the method comprising:

the remote assistance controller receiving a request from the user device for remote assistance, and in response, forwarding the request to the remote assistance device;

the remote assistor using the remote assistance device accepting the request from the user device for remote assistance, and in response, the remote assistance device sends a link or code to the remote assistance controller;

the remote assistance controller forwarding the link or code to the user device;

when a user of the user device clicks on the link or executes the code received from the remote assistance controller, the remote assistance controller begins a remote assistance session;

during the remote assistance session, generating and sending the requestor view to the user device and generating and sending the assistant view to the remote assistance device, wherein the assistant view sent to the remote assistance device includes at least one portion blanked according to the at least one criterion for blanking information in a remote assistance policy specified by the user, wherein the remote assistance controller receiving a proposed operation from the remote assistance device;

the remote assistance controller determining whether the proposed operation complies with the remote assistance policy; and when the proposed operation complies with the remote assistance policy, the remote assistance controller:
sends the proposed operation to the user device;
refreshes the requestor view;
sends the refreshed requestor view to the user device;
refreshes the assistant view; and
sends the refreshed assistant view to the remote assistance device.

13. The method of claim 12 further comprising terminating the remote assistance session in response to one of the user and the remote assistor selecting to terminate the remote assistance session.

14. The method of claim 12 wherein the remote assistance policy specifies to blank in the assistant view all portions of the display on the user device outside an active window of a specified software application.

15. The method of claim 12 wherein the remote assistance policy specifies to blank in the assistant view all portions of the display on the user device that provide control to programs on the user device other than a selected one program.

16. The method of claim 12 wherein the remote assistance policy comprises a list of allowed and disallowed operations on the user device.

17. The method of claim 12 wherein the remote assistance policy specifies to blank in the assistant view all portions of the display on the user device outside a box defined by the user.

18. The method of claim 12 wherein the remote assistance policy specifies to blank in the assistant view any personal information on the display on the user device.

* * * * *